Nov. 11, 1958  T. R. ROSENBERG  2,860,253
APPARATUS FOR PRODUCING STEREOSCOPIC FLUOROSCOPIC IMAGES
Filed April 19, 1957  2 Sheets-Sheet 1
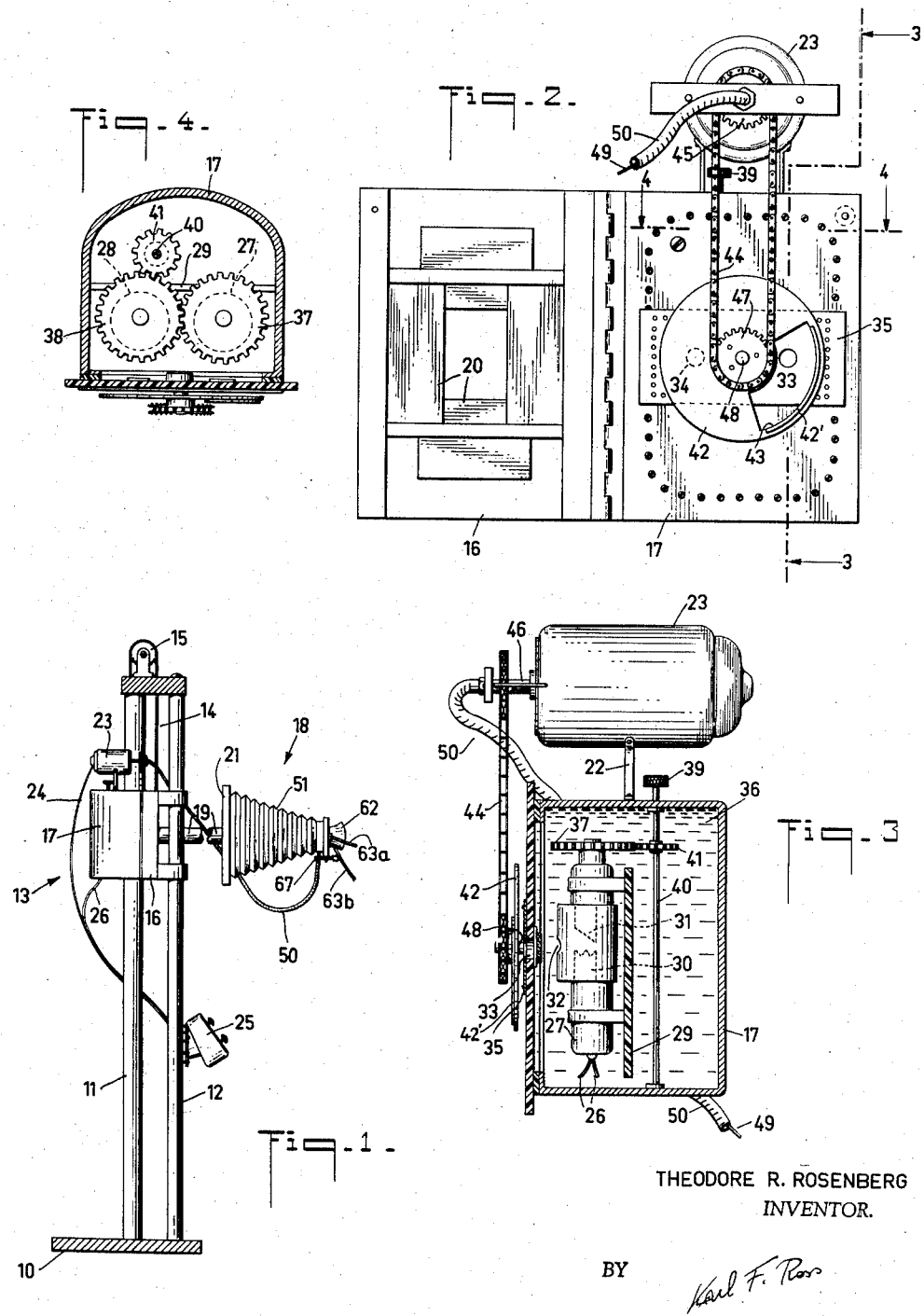
THEODORE R. ROSENBERG
INVENTOR.
BY *Karl F. Ross*
AGENT

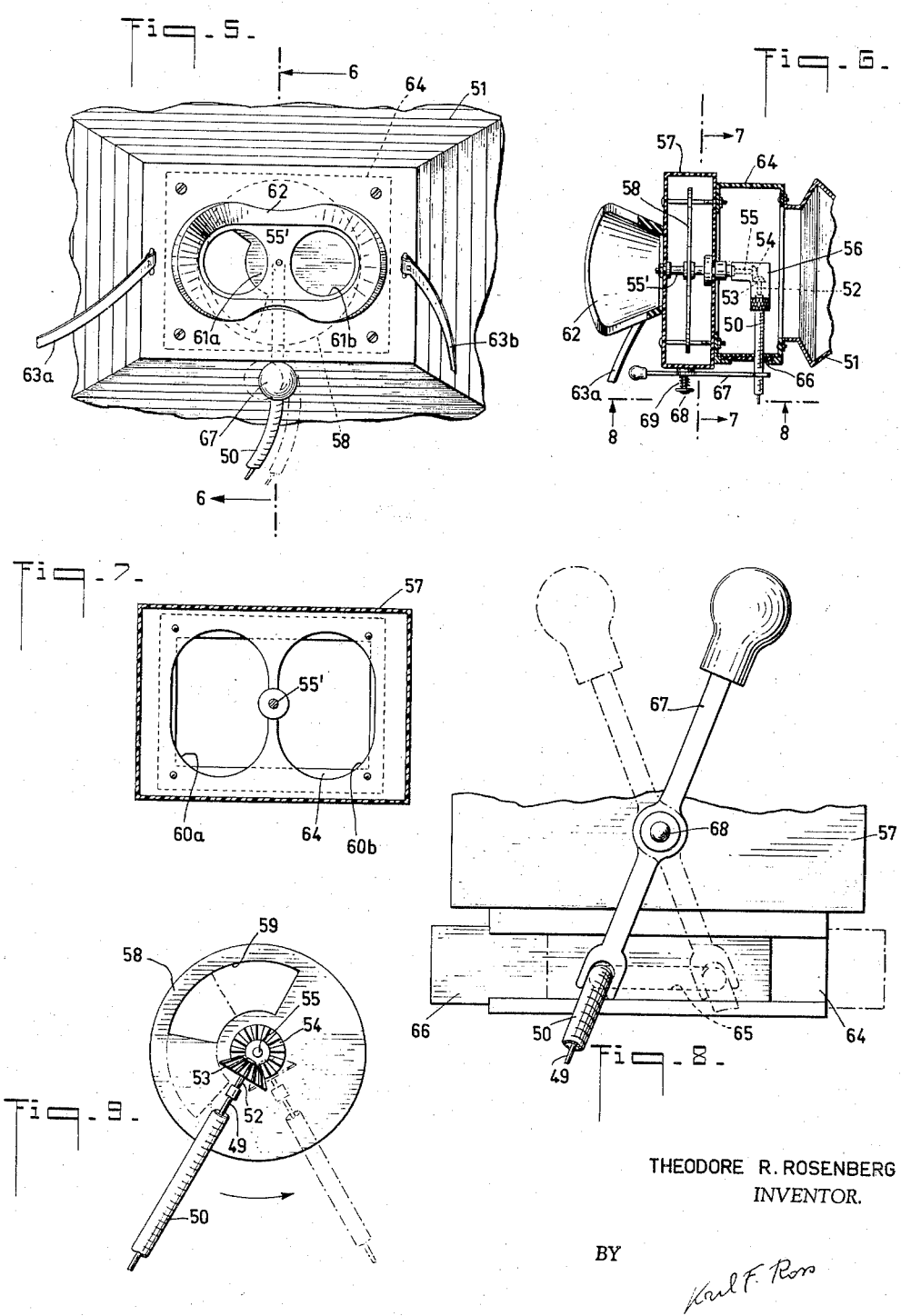

United States Patent Office 2,860,253
Patented Nov. 11, 1958

2,860,253

APPARATUS FOR PRODUCING STEREOSCOPIC FLUOROSCOPIC IMAGES

Theodore R. Rosenberg, Jackson Heights, N. Y.

Application April 19, 1957, Serial No. 653,832

6 Claims. (Cl. 250—60)

My present invention relates to apparatus for viewing objects by means of X-rays in such manner as to produce shadow images in stereoscopic relief on a fluorescent screen.

In the production of such images it is known to utilize two spaced-apart point sources of X-rays whose rays impinge at different angles upon a common screen by way of an object to be fluoroscoped, along with two synchronized rotating shutters for alternately obstructing these sources and simultaneously shielding the screen from alternately the right and the left eye of the viewer. Heretofore, difficulties have been encountered in precisely synchronizing the two shutters, especially where a certain adjustability between the viewer's eyepiece and the screen was desired. Thus, if a flexible shaft is used to drive the shutter of the eyepiece, a displacement of the latter relative to the stationary frame of the apparatus will generally vary, to some degree, the twist in the shaft so that the relative phasing of the two shutters is changed, with consequent blurring of the image.

In my U. S. Patent No. 2,537,373, issued January 9, 1951, I have disclosed an extendible bellows for X-ray apparatus which the fluoroscopist may use for the purpose of observing a projected image on a viewing screen, at different angles and from different distances, without being disturbed by outside light. An important object of the present invention is to provide a stereoscopic X-ray apparatus wherein the front shutter, i. e. the one located between the eyepiece and the screen, is received in a bellows of this description in such manner as to enable accurate synchronization in the various viewing positions. A more specific object, allied with the preceding one, is to provide a bellows-type viewing attachment for stereoscopic X-ray apparatus which, in addition to being adjustable for synchronization purposes, is of simple and light-weight construction so as to be conveniently supportable by the head of the user essentially in the same manner as is the bellows of my aforesaid prior patent.

In a broader sense, it is an object of my invention to provide means for adjustably interconnecting two rotating shutters, through the intermediary of a flexible shaft, in such manner as to enable ready compensation for deviations from a predetermined phase relationship due to variations in the relative positioning of the shutters or to other causes.

Furthermore, notwithstanding accurate synchronization of the two shutters, the image observed by a particular viewer on the screen of a stereoscopic X-ray apparatus may be unsatisfactory because of the correlation existing between the disalignment of the two projected X-ray images and the spacing of the viewer's eyes, this latter spacing varying among different individuals. It is, therefore, a further object of my present invention to provide simple and conveniently operable means for varying the disalignment of the projected images in an apparatus of the character referred to.

Thus, one of the features of my invention resides in the provision of a source of two adjustably intersecting X-ray beams comprising a substantially sealed casing, preferably filled with insulating oil, containing a pair of X-ray tubes positioned side by side and rotatable or otherwise displaceable relatively to each other by means of a control mechanism having an operating member, such as a knob, projecting from the casing. By way of two suitably positioned windows (which, if desired, could be combined into a single window) the rays emanating from the two tubes are adjustably directed upon a receiving surface, such as a fluorescent viewing screen.

According to another feature of the invention, there is provided forwardly of a fluorescent screen an expandible bellows equipped with an eyepiece and, behind the latter, with a rotatable shutter driven by a flexible shaft, the coupling between the shaft and the shutter including a sun gear and, rotatable about it and in mesh therewith, a planet gear whose movement about the sun gear in one sense or the other, brought about by an adjustable actuating member, advances or retards the phase of the rotating shutter with respect to a driving element connected with the other end of the flexible shaft. In a particularly simple and advantageous arrangement the sun gear and the planet gear are a pair of bevel gears disposed in an elbow-shaped supporting member, the shaft of the first bevel gear being coupled at one end of the elbow to the shutter shaft, the shaft of the second bevel gear being coupled at the other end of the elbow to the flexible shaft. The driving element is preferably coupled in a positive manner, through a mechanical linkage, with a second rotatable shutter interposed between the screen and the source of the two X-ray beams, although it is to be understood that the invention, at least in its broader aspects, is also applicable to systems in which the beams are alternately triggered on and off electrically, as is well known per se.

The above and other objects and features of my invention will be more fully apparent from the following detailed description, reference being had to the accompanying drawing in which:

Fig. 1 is a side-elevational view of an apparatus embodying the invention;

Fig. 2 is a front-elevational view, drawn to a larger scale, of the mechanism for driving the rear shutter inserted between the beam source and the screen in the apparatus of Fig. 1;

Fig. 3 is a sectional view taken on the line 3—3 of Fig. 2;

Fig. 4 is a sectional view taken on the line 4—4 of Fig. 2;

Fig. 5 is a front-elevational view of the eyepiece forming part of the apparatus of Fig. 1;

Fig. 6 is a fragmentary sectional view taken on the line 6—6 of Fig. 5;

Fig. 7 is a view taken on the line 7—7 of Fig. 6;

Fig. 8 is a fragmentary bottom view taken on the line 8—8 of Fig. 6; and

Fig. 9 is a somewhat diagrammatic view of the coupling mechanism linking the mechanism of Fig. 2 with the front shutter located behind the eyepiece of Fig. 5.

The apparatus shown in the drawing comprises a base 10 from which rise two pairs of standards 11, 12 (only one visible). Secured to these standards, at a suitable elevation above ground, is the fluoroscopic unit 13 whose vertical and horizontal position on the standards may be adjusted by well-known means not shown and which is balanced by a counterweight (not shown) inside standard 11 via a chain 14 passing around a pulley 15.

The unit 13 includes a diaphragm frame 16, a tube housing 17 hingedly secured to this frame, and a viewing assembly 18 attached to the frame by means of an arm 19 on which this assembly is swingably or slidably mounted so as to afford variable spacing between a fluorescent screen 21 and the diaphragm whose horizontal and vertical masking strips 20 may be moved inwardly or outwardly in a manner not further illustrated; screen 21 forms the rear surface of assembly 18.

Mounted on the tube housing 17, by means of a bracket 22, is a motor 23 energized via leads 24 from a control panel 25 on standard 12. Other leads 26 extend from this panel to a pair of conventional X-ray tubes 27, 28 rotatably mounted on a support 29 within housing 17. Each of these tubes is provided with a cathode 30 and an anode 31, as seen in Fig. 3, and has in its envelope a port 32 transparent to radiation which is aligned with a respective window 33, 34 (Figs. 2 and 3) in the front cover of the housing and in an additional lead shield 35 externally secured to this cover. The housing 17 is filled with an insulating oil 36.

Rigid with the tubes 27, 28 are a pair of gears 37, 38, respectively, which mesh with each other and serve to adjust the angular position and the effective spacing of these tubes under the control of a knob 39 positioned outside housing 17. Knob 39 is attached to a rod 40 which carries a pinion 41 meshing with gear 38. It will be apparent that rotation of knob 39 turns the two tubes in opposite directions, about axes which are offset from the tube axes, thereby varying the angle of intersection and the relative distance of the beams emitted through windows 33, 34. The effective cross-section of these beams can be varied by manipulation of the diaphragm strips 20 when the housing 17 has been swung from its inoperative position (Fig. 2) into its operative position (Fig. 1). The path of the beams also passes through a rear shutter 42, in the form of a rotatable disk of a material opaque to X-rays (such as lead) having an arcuate cutout 43, which is positively coupled with motor 23 through a chain 44 engaging a sprocket 45 on disk shaft 46 and a sprocket 47 on motor shaft 48. Disk 42 is balanced by the provision of an arcuate flange 42' adjacent its cutout 43.

The motor shaft 48 is also connected to a flexible shaft 49, surrounded by a sheath 50, which leads toward the front end of a flexible bellows 51 extending forwardly from the fluorescent screen 21; bellows 51 may be of the construction described and claimed in my prior Patent No. 2,537,373 referred to above. As best seen in Figs. 6 and 9, the other end of flexible shaft 49 is coupled to a shaft 52 carrying a bevel gear 53 which meshes with another bevel gear 54 on a shaft 55, the two bevel gears and their shafts being rotatably disposed inside an elbow 56 bodily swingable about the shaft 55. The latter shaft is coupled to an extension shaft 55' journaled in the walls of a chamber 57 secured to the smaller, forward end of the frusto-pyramidal bellows 51.

On shaft 55' there is mounted, within chamber 57, a front shutter 58 in the form of a rotatable disk, preferably of light-weight plastic material, having an arcuate cutout 59. Disk 58 is positioned between the large aligned apertures 60a, 60b provided in the rear wall of chamber 57 and in the front wall of bellows 51, on the one hand, and the much smaller viewing apertures 61a, 61b in the front wall of this chamber to which is secured a rubber mask 62 constituting, along with this apertured front wall, the eyepiece of the instrument. At 63a, 63b there are shown the extremities of a strap, extending from the front wall of chamber 57 on opposite sides of mask 62, which may be used to attach the eyepiece to the head of a viewer in the manner illustrated in Fig. 1 of my above-identified prior patent.

The forward end of bellows 51 is constituted by a plastic frame 64 whose bottom plate is formed with an elongated slot 65 (Fig. 8) through which passes the sheath 50 of flexible shaft 49. Slidably mounted underneath this bottom plate is a panel 66 having a hole traversed by the sheath 50. The projecting portion of the sheath is straddled by the bifurcate end of a lever 67 which is pivoted to the underside of chamber 57 by a stud 68, a spring 69 surrounding this stud so as to bear frictionally upon the lever 67. As will be readily apparent from Figs. 8 and 9, any displacement of the lever 67 against the frictional resistance of spring 69 will shift the sheath 50 laterally with respect to the axis of disk 58, thereby swinging the coupling elements within elbow 56 about the shafts 55, 55' in line with this axis. Bevel gear 53, in mesh with bevel gear 54, thus causes this latter gear to rotate, together with shafts 55, 55' and disk 58, through an angle corresponding to the extent of the displacement of lever 67; this changes the relative angular position of the cutouts 43, 59 on disks 42, 58, respectively, so as to enable correction of any phase displacement between the operative cycles of the two shutters.

In operation, a person to be fluoroscoped steps into the space between screen 21 and diaphragm frame 16, or an object to be examined is introduced into that space, whereupon a three-dimensional shadow picture will be apparent to the viewer as a result of the alternate flashing of disaligned images upon screen 21 by the projection device 27, 28, 42.

It will be understood that lever 67 and panel 66 represent only an illustrative embodiment of a mechanism for revolving a planet gear, such as the bevel gear 53, about a sun gear, such as the bevel gear 54, in the coupling of a flexible shaft 49 and its extension 52 to a rigid shaft 55, 55' and that various modifications of this mechanism, as well as of other elements described hereinabove and illustrated in the drawing, are possible without departing from the spirit and scope of the invention as defined in the appended claims.

I claim:
1. In a stereoscopic viewing system, in combination, a rotatable shutter and mechanism for synchronously coupling said shutter with a source of alternately projected images viewable through said shutter, said mechanism comprising drive means including a rotatable element, a first shaft having one end coupled with said element, a second shaft carrying said shutter, and adjustable coupling means between said second shaft and the other end of said first shaft including a sun gear positively coupled with one of said shafts, a planet gear positively coupled with the other of said shafts in mesh with said sun gear, and control means for revolving said planet gear about said sun gear.

2. In a stereoscopic viewing system, in combination, a rotatable shutter and mechanism for synchronously coupling said shutter with a source of alternately projected images viewable through said shutter, said mechanism comprising drive means including a rotatable element, a flexible shaft having one end coupled with said element, a planet gear on the other end of said flexible shaft, a sun gear in mesh with said planet gear, means positively coupling said sun gear with said shutter, and control means for revolving said planet gear about said sun gear.

3. The combination according to claim 2, wherein said sun and planet gears are bevel gears.

4. In a fluoroscopic apparatus having a screen and projection means for alternately flashing relatively disaligned X-ray images of an object upon said screen, in combination, an extendible bellows mounted forwardly of said screen, an eyepiece at the forward end of said bellows, a rotatable shutter between said eyepiece and said screen adapted to shield said screen alternately from the right and the left eye of a viewer, a driving element rotatable in synchronism with the alternations of said source, a flexible shaft having one end positively coupled with said driving element, a rigid shaft carrying said shutter, a first bevel gear on said rigid shaft, a second bevel gear on the other end of said flexible shaft and in mesh with said first bevel gear, and adjusting means operable to revolve said second bevel gear about said first bevel gear.

5. The combination according to claim 4, further comprising an albow-shaped coupling member having a first extremity containing an end of said rigid shaft and said first bevel gear as well as a second extremity containing said other end of said flexible shaft and said second bevel gear, said coupling member being bodily swingable about said rigid shaft by said adjusting means.

6. A stereoscopic viewing assembly for fluoroscopic apparatus, comprising a fluorescent screen, projection means for alternately flashing relatively disaligned X-ray images of an object upon said screen, an extendible bellows mounted forwardly of said screen and having an eyepiece at its forward end, a rotatable shutter between said eyepiece and said screen adapted to shield said screen alternately from the right and the left eye of a viewer, and mechanism for synchronously coupling said first shutter with said projection means; said projection means including a substantially sealed housing, a pair of X-ray tubes mounted inside said housing, and another rotatable shutter between said housing and said screen, said housing being provided with window means permitting passage of radiation from said tubes to the exterior; said mechanism including a flexible shaft linking said shutters with each other, said other shutter being opaque to said radiation, and adjustable coupling means between said flexible shaft and the first-mentioned shutter, said coupling means including a rigid shaft for said first-mentioned shutter, a sun gear on said rigid shaft, a planet gear on said flexible shaft in mesh with said sun gear, and adjusting means for revolving said planet gear about said sun gear.

References Cited in the file of this patent

UNITED STATES PATENTS

| | | |
|---|---|---|
| 1,995,054 | Chambers | Mar. 19, 1935 |
| 2,214,621 | Leishman | Sept. 10, 1940 |
| 2,537,373 | Rosenberg | Jan. 9, 1951 |